March 30, 1954   W. M. PIERSON   2,673,580
CIRCULAR SAW ASSEMBLY
Filed Sept. 1, 1951   3 Sheets-Sheet 1

*INVENTOR.*
WINFERD M. PIERSON
BY
ATTORNEY

March 30, 1954

W. M. PIERSON 2,673,580

CIRCULAR SAW ASSEMBLY

Filed Sept. 1, 1951

INVENTOR.
WINFERD M. PIERSON
BY
ATTORNEY

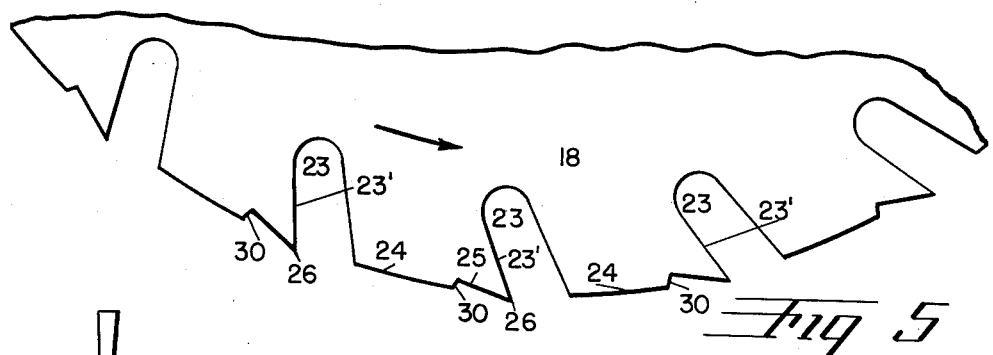
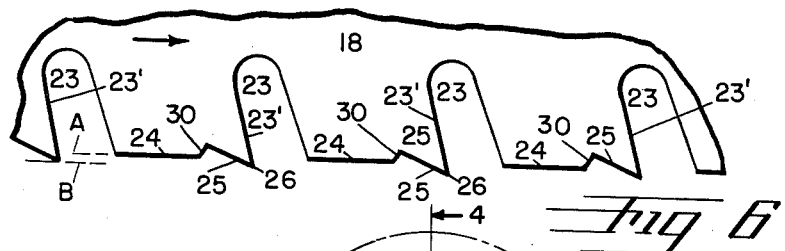
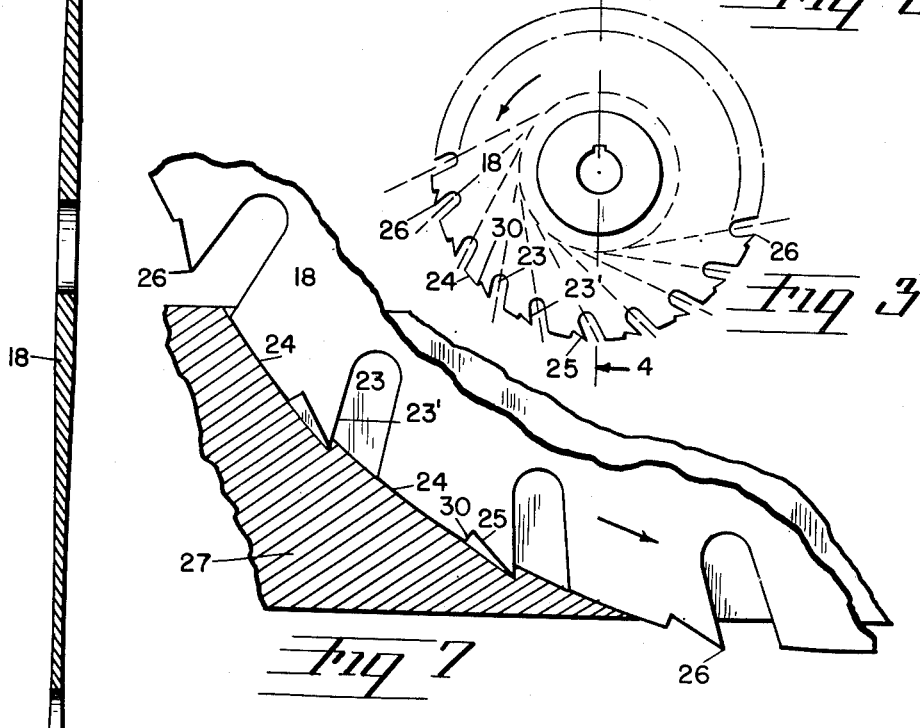

Patented Mar. 30, 1954

2,673,580

UNITED STATES PATENT OFFICE 2,673,580

CIRCULAR SAW ASSEMBLY

Winferd M. Pierson, La Grande, Oreg., assignor to Mount Emily Lumber Co., La Grande, Oreg., a corporation of Oregon Application September 1, 1951, Serial No. 244,785

4 Claims. (Cl. 143—33)

This invention relates in general to circular saws, primarily intended for rip-sawing but also capable of other sawing, and relates to assemblies in which a plurality of identical, adjustably spaced, circular saws are rotated in unison.

More specifically, the invention relates to a so-called edger saw assembly in which such a plurality or bank of circular saws, adjustably spaced apart laterally, are employed for the purpose of rip-sawing a large slab or large piece of lumber into strips of predetermined desired width, or for rip-sawing or trimming longitudinal edge sections from a slab, or from a piece of lumber, and thereby produce a piece of lumber of desired width having straight parallel opposite edge faces throughout its extent.

As is well known, a standard type of edge saw assembly includes rotating circular saws which may be mounted below and extend slightly above the horizontal plane in which the lumber travels, or is fed through the saws, or the saws may be mounted above and extend slightly below the horizontal plane of travel of the lumber. In either case it has heretofore been found necessary to feed the lumber to the saws against the direction in which they are rotating, for if the lumber were fed to ordinary circular saws in the direction of their rotation, the rotational or peripheral speed of such ordinary saws would attempt to thrust the lumber past the saws more rapidly than the lumber could be cut, either splitting the lumber and causing it to fly apart in pieces, or, more probably, causing the saws to jam. To feed the lumber against the rotational direction of the saws it is necessary to provide suitable feeding means, such as driven rollers supporting the lumber, and also to provide suitable means for holding the lumber down in its horizontal plane of travel so as to prevent any possibility of the lumber being lifted or tilted from such horizontal plane upon contact with the saws. Also of course such feeding and holding means for the lumber must absolutely prevent any possibility of the so-called "kick-back" or thrusting of the lumber back in the opposite direction by the peripheral speed of the saws.

Many serious accidents have occurred in the past due to a piece of lumber being "kicked-back" by a rotating saw, the velocity of such "kick-backs" being very high.

Due to the necessity heretofore of providing such feeding means and means for keeping the lumber in its plane of travel and for preventing or guarding against any possible "kick-backs," the actual sawing operation performed by edger assemblies and the like has been almost completely obscured from the vision of the operator.

One of the objects of the present invention is to provide an improved and simplied circular saw assembly, or edger saw assembly, in which the operator will be able to have an unobscured view of the actual sawing as it takes place.

A related object of the invention is to provide an improved edger saw assembly in which no special feeding means will be required near the saws for the lumber and in which no means for holding the lumber in its horizontal plane of travel will be necessary, with the result that the elimination of such means will enable the sawing operation to be unobstructed.

Another object of the invention is to provide an improved edger saw assembly in which the lumber will travel in the direction in which the saws rotate instead of against such direction.

A further object of the invention is to provide an edger saw assembly having saws which of and by themselves will act to prevent any jamming of the saws taking place and to prevent any "kickbacks" from occurring.

An additional object of the invention is to provide an improved and simplified edger saw assembly having a specially formed bed plate or work table over which the lumber will travel before, during, and after the actual sawing operation, and with such bed plate adapted to act in cooperation with the saws so as to maintain the lumber in a desired horizontal position and plane of travel until the sawing operation is completed and the sawed lumber is discharged from the device.

A still further object of the invention is to provide an edger which will include a circular saw of improved formation and design, which saw, in addition to performing the actual sawing of the lumber, will function to move the lumber at the proper uniform speed past the saw and in the direction of saw rotation, so that there will be no probability of the saw jamming or "kicking-back."

Another object of the invention is to provide an edger with an improved circular saw which will be easier to maintain and to sharpen than ordinary types of circular saws previously used in such assemblies, and at the same time to provide a saw on which the wear will be less rapid than that which occurs on the types of edger saws or rip-saws heretofore employed.

The manner in which these objects and other advantages are achieved with my invention, the particular improved and simplified arrangement of my assembly, the manner in which the sawing or edging is performed, and the specifically improved type of circular saw which I employ in my assembly, will be briefly described with reference to the accompanying drawings.

In the drawings:

Fig. 3 is an elevation of one of the improved circular saws of the assembly;

Fig. 4 is a vertical cross section taken diametrically through the saw of Fig. 3, the section thus corresponding to line 4—4 of Fig. 3, but drawn to a much larger scale;

Fig. 5 is a fragmentary elevation of a portion of the same saw drawn to a still larger scale;

Fig. 6 is a developed view of a portion of the saw periphery to illustrate the two radial lengths to which the periphery is ground;

Figure 1:
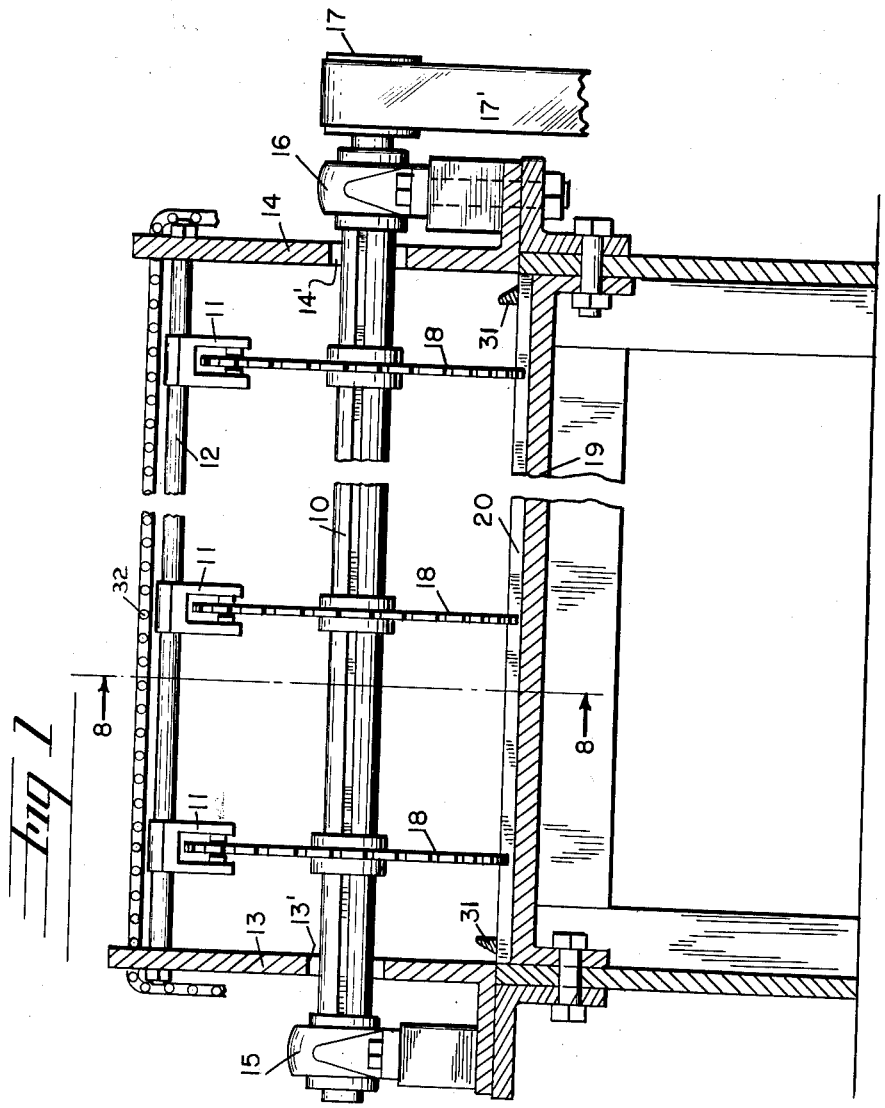
Fig. 1 is a vertical transverse section of my saw assembly taken approximately on line 1—1 of Fig. 2, some of the details of the parts, which are well known and with which the present invention is not concerned, being omitted or merely indicated more or less diagrammatically for the sake of clarity.
Figure 8:
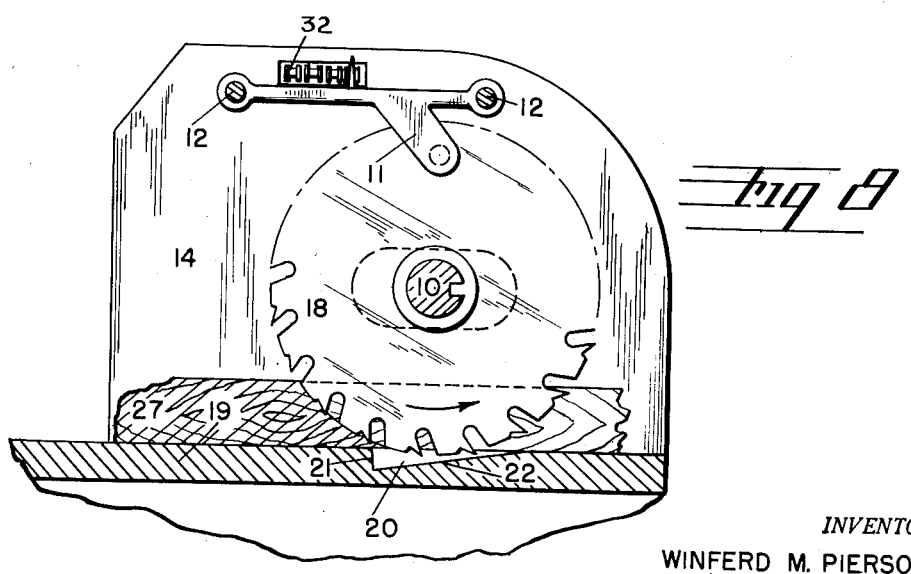

Fig. 7 is a fragmentary sectional elevation showing the action of the saw during the sawing operation and illustrating both the action of the cutting teeth in cutting and moving the lumber which is being sawed and the braking action exerted by the circular peripheral portions of the saw in controlling the rate of travel imparted to the lumber; and Fig. 8 (sheet 2) is a vertical section on line 8—8 of Fig. 1; and also showing portion of a strip of wood in the process of being sawed.

Figure 2:
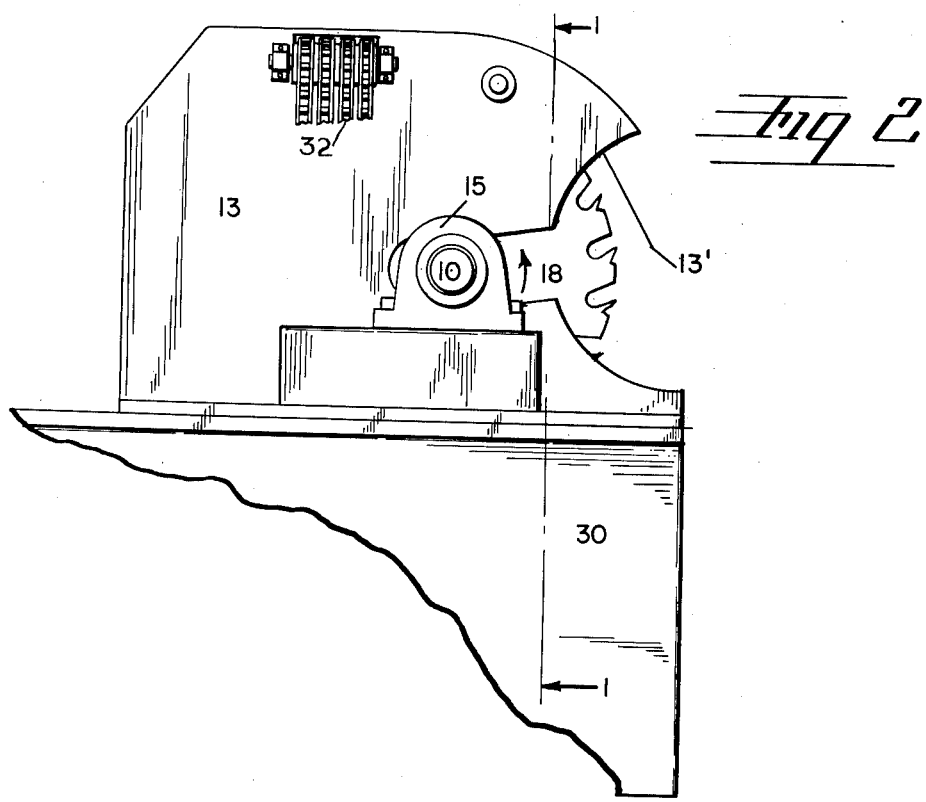
Fig. 2 is a fragmentary side elevation taken from the left of Fig. 1.

Referring first to Figs. 1 and 2, my assembly includes a driven arbor or shaft 10 on which a plurality of identical circular saws 18 (to be described later) are mounted. The shaft 10 has a longitudinally-extending keyway and the hubs of the circular saws have keys extending into the keyway so that the saws will be rotated by and with the shaft 10 while being laterally adjustable on the shaft.

A forked yoke 11 extends downwardly over the upper portion of each saw with the fingers of the yoke positioned on opposite faces of the saw. These yokes 11 are slidably supported on suitable cross bars 12 and the ends of the cross bars are supported by the side plates 13 and 14 extending up from the sides of the work table to a distance above the top line of the saws. The work table is supported on a suitable base frame 30 as usual. Customary means are provided for selectively moving each of the yokes 11 on the cross bars 12 and thereby laterally adjusting the position of the related saw. The particular adjusting means which I employ includes a plurality of endless chains 32, one secured to each yoke, which pass over pulleys or sprockets mounted at the tops of the side plates 13 and 14 and pass over pulleys located at the sides below the work table and then extend across beneath the work table. Each chain passes around a suitable sprocket (not shown) below the work table and each sprocket has gear connection with a separate crank to enable the respective chain, and therewith the related yoke and saw, to be set at a desired position. Other means for selectively moving the yokes 11 could of course be used, and also either electric or hydraulic means.

The saw shaft 10 is mounted in adjustable bearing supports (indicated at 15 and 16 in Fig. 1) mounted on opposite sides of the work table. A belt pulley 17 is secured on one end of the shaft 10 beyond the support 16 and a belt 17' connects the pulley 17 to a suitable source of power. Preferably the bearing support 16 for the shaft 10 has a pivotal mounting to enable the shaft 10, and with it the saws on the shaft, to be swung out away from the yokes 11 when the other bearing support 15 is unfastened from the work table, and the side plate 13 has an open-end slot 13' to accommodate the saw shaft 10 and permit it to be swung out clear of the side plate 13, while the other side plate 14 has an elongated slot 14' long enough to permit such swing of the shaft when the bearing 15 is unfastened. The structure thus far described is old in the art and does not constitute a part of the present invention and therefore need not be described further.

An important and novel feature of my assembly, which will be noted in Figs. 1 and 8, is that the circular saws which are indicated in general by the reference character 18, extend down slightly below the top face of the work table or bed plate 19 but do not extend all the way through the bed plate 19, and also, as will be understood better later, since the saws are all positioned above the work table, they are entirely visible to the operator at all times.

Another very important and novel feature of my device is the fact that the work table or bed plate 19 has a transversely-extending groove 20 to accommodate the bottom edges of the saws 18. The cross sectional shape of this groove 20 is novel and important and, as shown in Fig. 8, this groove is formed with a substantially vertical lateral wall 21 and an upwardly sloping bottom wall 22. The reason for this particular formation of the groove will also be explained later.

The saws 18 in my assembly are identical and therefore only one of them need be described. Reference is to be made to Figs. 3, 5, 6, 7, and 8. In these figures the arrows indicate the direction of rotation of the saw. The periphery of the saw blade 18 illustrated in these figures is formed with a plurality of identical, equally-spaced notches or slots 23 (the number of notches depending upon the number of teeth desired). These notches 23 are shaped preferably substantially as shown and the notches slope obliquely in the direction of rotation of the saw, the center lines of all the notches being tangential to some smaller circle concentric with the saw blade as indicated in broken lines in Fig. 3. The portions of the saw periphery immediately preceding the notches, thus the peripheral sections 24 of Figs. 3, 5, 6 and 7, are arcs of uniform and constant radius. The rear lateral edge 23' of each notch extends out beyond the circle of the peripheral sections 24 so that the outer ends of these edges lie in a circle of slightly larger radius. Thus the two circles to which the periphery of the saw blade is ground are indicated by the lines A and B in the developed view constituting Fig. 6.

The portions of the periphery between the arcs 24 and the tips of the rear edges 23' of the slots are then ground in obliquely outwardly sloping lines 25 so as to form points or teeth 26 with the outer tips of the edges 23'. Consequently the saw when ground has a succession of regularly spaced teeth 26 lying in one circle and a succession of arcuate peripheral portions 24 following the teeth 26 respectively and lying in a circle of slightly smaller radius.

In the grinding of the saw blade first the circle for the tips of the edges 23' is established, thus determining the diameter of the circle in which the teeth of the saw are located. Next the circle for the peripheral arcuate sections 24 is established and the peripheral sections 24 are ground down to this circumference of slightly smaller radius. Finally the portions 25 are ground so as to produce inwardly-extending shoulders 30 at the forward ends of the arcuate sections 24 and to meet the established tips of the edges 23' and thereby complete the formation of the teeth 26.

The resharpening of the saw is done in the same manner and consequently the resharpening of this saw is a relatively simple matter. The saw blade is preferably hollow ground, and as indicated in Fig. 4, the thickness of the saw is reduced between the hub and peripheral portions in the customary manner in order to eliminate the necessity of any "set" in the saw teeth for reducing friction.

The arcuate sections 24 should extend for at least half the distance between the successive notches 23 and preferably for more than half this distance, as shown in Figs. 5 and 6.

The manner in which the saw, when so ground, functions can be described most clearly with reference to Fig. 7. In this figure the saw is represented in the act of sawing the piece of wood 27, the saw rotating of course in the direction indicated by the arrow. As each tooth 26 engages the wood in the cut or kerf which is being made, the tooth not only cuts the groove or kerf slightly deeper but also, as will be readily understandable, exerts a tendency to pull the wood along on the work table into the saw, or in the general direction of rotation of the saw, this tendency thus being to move the block of wood 27 from left to right as viewed in Fig. 7. With ordinary circular saws such engagement of the teeth, as is well known, would cause the wood to travel against the saw with such speed as to jam the saw. However, as each tooth 26 cuts slightly deeper and exerts its tendency to pull the wood into the saw the bottom of the kerf or groove in the wood comes into engagement with the succeeding arcuate section 24 of the saw periphery, which portion of the saw periphery slides along the bottom of the groove without cutting it deeper and momentarily holds the wood against further travel.

Thus each tooth cuts the groove slightly deeper and moves the wood slightly ahead, the sawdust from the cut being carried by the notches 23 out of the wood and thrown off from the saw, and, at the same time an arcuate peripheral portion following each tooth temporarily restrains the travel of the wood and does not permit the groove to be cut deeper until the next tooth comes along. In other words, the action of the saw is to cut the groove or kerf in the wood deeper with each tooth and to move the wood along at the same rate at which it is cut. The speed with which the wood is moved into the saw can never be greater than the speed at which it is cut. This speed of course will depend upon three factors; namely, (1) the number of teeth; (2) the speed of rotation; and (3) the distance which the teeth extend out beyond the circle of the arcuate sections 24, or in other words, the difference of the radii of the circles A and B (Fig. 6). This latter amount would of course never be more than a fraction of an inch and would be determined largely by the size of the saw and other related circumstances.

Since the wood is moved by the saw at the rate at which the wood is sawed, the travel of the wood with the saw will never be such as to cause the wood to be shot out from the saw at a speed which would be dangerous to anyone in the path of the sawed wood and since the wood travels with the saw and not against it as heretofore, there is no such thing with my assembly as "kick-back."

As soon as the wood to be cut comes in contact with the rotating saws, the feeding of the wood to the saws is done by the saws themselves, as previously mentioned. Consequently with my improved assembly the customary feeding means or driven feeding rollers for the wood can be dispensed with. All that is necessary is for the wood to be shoved along the work table until it comes into contact with the rotating saws and then the rest of the operation takes place automatically. Of course the usual side guides 31 (Fig. 1) for the wood are provided on the work table so that the wood will be properly positioned on the work table as it is contacted by the saws.

Referring to Fig. 8, when the wood 27 is first contacted by the saws, the engagement of the saw teeth with the top forward edge of the wood with the saw teeth pressing downwardly and forwardly on this top forward edge, might have a tendency to tilt the wood and cause the rear end of the wood to be lifted upwardly from the work table. If the wood which is being cut is long or heavy the weight of the wood would be sufficient to overcome this tendency. However with short or light-weight boards there might be insufficient weight of the wood to resist this tendency to be tilted at the start of the sawing. Such tilting, however, at most would occur for only a moment and then, as such board is moved forwardly by the saws the bottom edge of the forward end of the board would contact the upwardly sloping bottom 22 of the groove 20 and travel along this until the bottom forward edge of the board is again on the top of the work table. This raising of the bottom forward edge of the board back to the normal plane of travel, as the forward end of the board passes the saws and while the saws bear down in the cuts being made, will act to cause such board to resume absolute horizontal position and such position will then be retained throughout the balance of the sawing operation. Thus the arrangement of the slot 20 with the sloping shallow bottom wall 22 prevents even light short boards from being tilted upwardly to any extent sufficient to interfere with their proper continuous sawing and prevents the travel of the boards from being impeded by such tilting, and finally causes them, after a moment, to return to normal horizontal position of travel.

While some modifications in the shape of the transverse slot 20 might be made, I have found it best to have the rear wall 21 substantially vertical as shown, thus enabling the bottom 22 of the slot to have a relatively long gradual slope upwardly and forwardly in the direction of travel of the wood, so as to accommodate all possible positions of the forward bottom edge of a piece of wood or board which is being cut, without having the slot 20 any wider than necessary for safe clearance for the saws. The gradual upward slope of the bottom 22 is important in preventing any undesired reaction on the part of the front end of the board when its bottom forward edge contacts the bottom of the slot.

Inasmuch as no means is required for feeding the lumber or boards to the saws during the cutting and since no means is required for holding the boards down or for keeping them in the horizontal plane of travel during the cutting, and also since no guard or shield or other protective means against any "kick-back" is required, and since the saws are positioned above the work table, there is nothing in my assembly to obscure the saws from view. Consequently the sawing operation can be watched at all times by the operator without any difficulty and without any danger, whether the operator is stationed behind or to either side of the device. This is an important feature of my improved assembly.

The maintenance of my assembly requires only a minimum amount of care. The resharpening of each of the saws, when necessary, which is accomplished in the manner previously explained, requires much less care and labor than is required for sharpening the more conventional types of circular saws. The shoulders 30 in the saw periphery enable the rear edges 25 of the teeth to meet the forward edges 23' in a narrower acute angle, without extending the arcuate sections 24, reducing the expanse of the teeth and reducing the heating and wear of the rear portion of the teeth. Since there is no possibility of jamming the saws in their normal operation in my assembly and since the sawing always takes place in full view of the operator, the chances of the saws incurring any special damage are practically eliminated, and the special saw construction, with the circumferential or arcuate sections of constant diameter, and with the cutting teeth extending only a slight distance beyond the circumference established by these extending arcuate sections, with no possibility of any tooth cutting beyond a slight predetermined depth, results in an edge saw assembly in which the customary wear on the saws is held to a minimum.

I claim:

1. An edger saw assembly including a plurality of identical circular rotating saws mounted on the same axis, each of said saws having a plurality of identical, equally-spaced notches extending inwardly from the saw periphery and sloping obliquely outwardly in the direction of saw rotation, the center lines of said notches being tangential to a circle concentric with the saw, the sections of the saw periphery immediately ahead of said notches respectively constituting circumferential arcs of uniform radius, each of said arcs extending on said saw periphery for more than half the distance between successive notches, the rear lateral edges of said notches extending out to points in a circle of slightly greater radius than the radius of said arcs, the portions of said saw periphery between the forward ends of said arcs and the outer ends of said rear lateral edges of said notches sloping forwardly outwardly to meet said lateral edges at said points in tooth formation, said latter mentioned portions beginning inwardly offset from, and thereby forming shoulders with, the forward ends of said arcs, a work table having a substantially horizontal top working surface, a groove extending across said working surface parallel to the axis of said saws, said saws mounted above the axis of said saws, said work table and extending down a slight distance into said groove, said groove being no wider than necessary to provide safe clearance for said saws, and said groove having a substantially vertical rear wall and a bottom wall sloping gradually upwardly and forwardly in the direction of rotation of said saws to said top working surface.

2. In an edger saw assembly of the character described, a plurality of identical circular rotating saws mounted on the same axis, each of said saws having a plurality of identical, equally-spaced notches extending inwardly from the saw periphery, and sloping obliquely outwardly in the direction of saw rotation, the sections of the saw periphery immediately ahead of said notches respectively constituting circumferential arcs of uniform radius, each of said arcs extending on said saw periphery for at least half the distance between successive notches, the rear lateral edges of said notches extending out a slight distance beyond the circumferential line of said arcs to form teeth, the portions of said saw periphery between the forward ends of said arcs and the points of said teeth sloping forwardly outwardly and constituting the rear edges of said teeth, a work table having a substantially horizontal top working surface and a groove extending across said working surface parallel to the axis of said saws, said saws mounted above said work table and extending down a slight distance into said groove, said groove being no wider than necessary to provide safe clearance for said saws, a steep rear wall and a bottom wall sloping gradually upwardly and forwardly in the direction of rotation of said saws to said top working surface, a side guide on said work table for material being sawed, and means for adjusting said saws laterally.

3. In a sawing device, a circular rotating saw mounted on a horizontal axis, said saw having a plurality of identical, equally-spaced notches extending inwardly from the saw periphery, the sections of the saw periphery immediately ahead of said notches respectively constituting circumferential arcs of uniform radius, a work table having a substantially horizontal top working surface and a groove extending entirely across said working surface parallel to the axis of said saw and normal to the direction of travel of the work through the sawing device, said saw mounted above said work table and extending down a slight distance into said groove, said groove being no wider than necessary to provide safe clearance for said saw, a rear wall in said groove, and a bottom wall in said groove sloping gradually upwardly and forwardly in the direction of rotation of said saw and in the direction of travel of the work to said top working surface, whereby any upward tipping of the work from horizontal position upon first encounter with the saw will cause the forward bottom edge of the work to be depressed into said groove and the contact of said forward bottom edge of the work with said sloping bottom wall of said groove will restore the traveling work to horizontal position.

4. In a saw assembly, a plurality of identical circular rotating saws mounted on the same axis, each of said saws having a plurality of identical, equally-spaced notches extending inwardly from the saw periphery, the sections of the saw periphery immediately ahead of said notches respectively constituting circumferential arcs of uniform radius, each of said arcs extending on said saw periphery for at least half the distance between successive notches, a work table having a substantially horizontal top working surface and a groove extending entirely across said working surface parallel to the axis of said saws and normal to the direction of travel of the work through the edger saw assembly, said saws mounted above said work table and extending down a slight distance into said groove, said groove being no wider than necessary to provide safe clearance for said saws, said groove having a bottom wall sloping gradually upwardly and forwardly in the direction of rotation of said saws and in the direction of travel of the work to said top working surface, whereby any upward tipping of the work from horizontal position upon first encounter with the saws will cause the forward bottom edge of the work to be depressed into said groove and the contact of said forward bottom edge of the work with said sloping bottom wall of said groove will restore the traveling work to horizontal position.

WINFERD M. PIERSON.

References Cited in the file of this patent

UNITED STATES PATENTS

| Number | Name | Date |
|---|---|---|
| 7,603 | Knowles | Aug. 27, 1850 |
| 73,226 | Boynton | Jan. 14, 1868 |
| 318,938 | Allen | June 2, 1885 |
| 509,736 | Hanson | Nov. 28, 1893 |
| 2,077,118 | Lewis | Apr. 13, 1937 |
| 2,559,355 | Grupp | July 3, 1951 |